(12) United States Patent
Nishizaka

(10) Patent No.: US 9,253,406 B2
(45) Date of Patent: Feb. 2, 2016

(54) IMAGE CAPTURE APPARATUS THAT CAN DISPLAY REVIEW IMAGE, IMAGE CAPTURE METHOD, AND STORAGE MEDIUM

(71) Applicant: CASIO COMPUTER CO., LTD., Shibuya-ku, Tokyo (JP)

(72) Inventor: Nobuyoshi Nishizaka, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/191,124

(22) Filed: Feb. 26, 2014

(65) Prior Publication Data
US 2014/0267836 A1 Sep. 18, 2014

(30) Foreign Application Priority Data

Mar. 15, 2013 (JP) ................................. 2013-053538

(51) Int. Cl.
*H04N 5/232* (2006.01)
(52) U.S. Cl.
CPC ....... *H04N 5/23293* (2013.01); *H04N 5/23222* (2013.01)
(58) Field of Classification Search
CPC ............... G06F 3/005; H04N 1/00408; H04N 1/00416; H04N 1/2125; H04N 1/00477; H04N 1/0048; H04N 1/00442; H04N 1/00445; H04N 1/00448; H04N 1/0045; H04N 1/00453; H04N 1/00456; G03B 17/18; G03B 17/20; G03B 2217/18
See application file for complete search history.

(56) References Cited

U.S. PATENT DOCUMENTS

| | | | | |
|---|---|---|---|---|
| 2008/0055453 | A1* | 3/2008 | Battles et al. | 348/333.05 |
| 2008/0273110 | A1* | 11/2008 | Joza et al. | 348/333.05 |
| 2011/0090353 | A1 | 4/2011 | Hirata | |

(Continued)

FOREIGN PATENT DOCUMENTS

| | | |
|---|---|---|
| JP | 2001-117163 A | 4/2001 |
| JP | 2008-092299 A | 4/2008 |
| JP | 2011087256 A | 4/2011 |
| JP | 2011151614 A | 8/2011 |
| JP | 2012-015827 A | 1/2012 |

OTHER PUBLICATIONS

Japanese Office Action dated Aug. 12, 2014, issued in counterpart Japanese Application No. 2013-053538.

(Continued)

*Primary Examiner* — Mekonnen Dagnew
(74) *Attorney, Agent, or Firm* — Holtz, Holtz & Volek PC

(57) ABSTRACT

A live view image generation unit sequentially displays on a display screen a captured image that is sequentially outputted from an image capture unit as a live view image. In a case of photographing and recording being directed, a review image generation unit displays a captured image for recording outputted from the image capture unit as a first review image on a portion of a display screen in a state of displaying the live view image. A photographing result evaluation unit evaluates a photographing result based on a captured image for recording outputted from the image capture unit according to an direction for photographing and recording. The review image generation unit performs display control to make a display form of the first review image different according to the evaluation result by the photographing result evaluation unit.

13 Claims, 8 Drawing Sheets

(56) References Cited

U.S. PATENT DOCUMENTS

2012/0105676 A1* 5/2012 Park .......................... 348/231.3
2013/0135499 A1* 5/2013 Song ....................... 348/240.99

OTHER PUBLICATIONS

Japanese Office Action dated Nov. 18, 2014, issued in counterpart Japanese Application No. 2013-053538.

* cited by examiner

CAMERA SHAKE
(ENTIRELY)

SUBJECT MOTION BLUR
(SUBJECT BLURRING)

CLOSED EYES
(EYES CLOSED)

DEFOCUSING(IN THE MODE OF
CAPTURING MAIN SUBJECT)

MISMATCH OF EXPOSURE AMOUNT
(IN THE MODE OF CAPTURING MAIN SUBJECT PERSON)

CASE OF SUCCESS IN PHOTOGRAPHY (A) CASE OF FAILURE IN PHOTOGRAPHY
(CLOSED EYES)

"Δ" OPERATION WITHIN PREDETERMINED PERIOD OF TIME →

(B) DISPLAYING PART IN WHICH PHOTOGRAPHY FAILURE FACTOR OCCURS ON OVERALL SCREEN

"Δ" OPERATION →

(C) STATE OF DISPLAYING A PLURALITY OF MINI PHOTOGRAPHING REVIEW IMAGE

DISPLAY DIRECTION

CASE OF SUCCESS IN PHOTOGRAPHY (A) CASE OF FAILURE IN PHOTOGRAPHY
(CLOSED EYES)

"Δ" OPERATION WITHIN PREDETERMINED PERIOD OF TIME (B) DISPLAYING PART IN WHICH PHOTOGRAPHY FAILURE FACTOR OCCURS ON OVERALL SCREEN (CASE OF SUCCESS
IN PHOTOGRAPHY)
(CASE OF FAILURE
IN PHOTOGRAPHY
(CLOSED EYES))
FIG. 8A
FIG. 8C
MINI PHOTOGRAPHING REVIEW
DISPLAY SETTING
MINI PHOTOGRAPHING REVIEW
DISPLAY SETTING
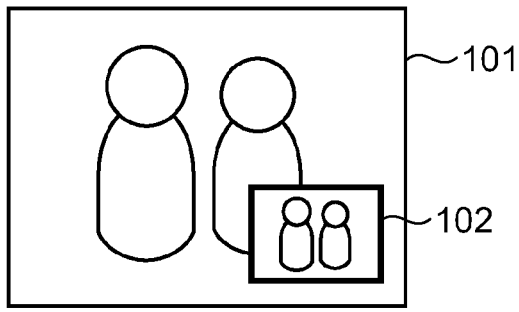
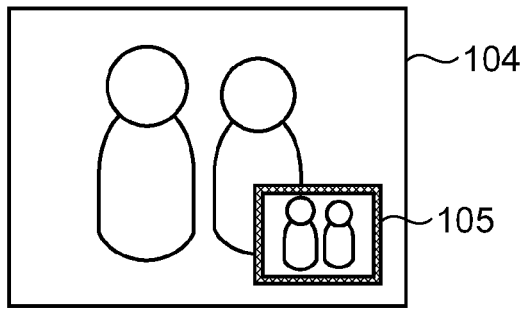
FIG. 8B
FIG. 8D
ENTIRE SCREEN REVIEW
DISPLAY SETTING
ENTIRE SCREEN REVIEW
DISPLAY SETTING
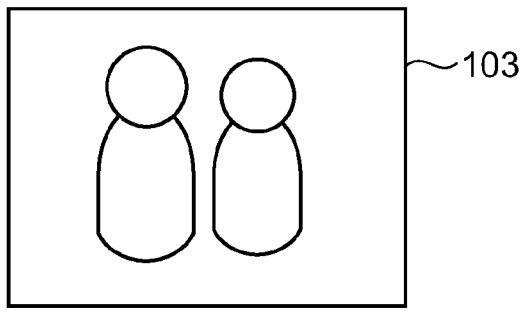
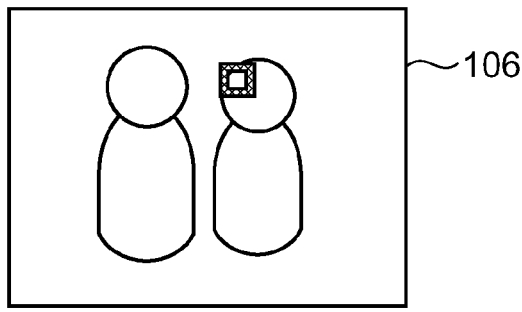

IMAGE CAPTURE APPARATUS THAT CAN DISPLAY REVIEW IMAGE, IMAGE CAPTURE METHOD, AND STORAGE MEDIUM

This application is based on and claims the benefit of priority from Japanese Patent Application No. 2013-053538, filed on 15 Mar. 2013, the content of which is incorporated herein by reference.

BACKGROUND OF THE INVENTION

1. Field of the Invention

The present invention relates to an image capture apparatus that can display a review image, a display method of an image capture apparatus, and a storage medium.

2. Related Art

Conventionally, an image capture apparatus having a review display function for displaying a captured image on an entire display screen in place of a live view image has been known which is configured so as to let a user to review captured images captured by a user's operation while displaying a live view displaying data of a captured image outputted for each predetermined time period from an image capture unit in real time on a display screen in a photographing mode. Hereinafter, a captured image displayed in real time on a display screen while displaying a live view is referred to as "live view image" and a captured image displayed for review after operation by a user is referred to as "review image".

Furthermore, an image capture apparatus having a review display function has been known which also has a function to display captured images captured by a user's operation on a portion of a display screen while displaying a live view image. Hereinafter, a captured image displayed on a portion of a display screen while displaying a live view image is referred to as "mini photographing review image".

By displaying a mini photographing review image while displaying a live view image, a live view display is no longer interrupted as in the case of a review image being displayed on an entire display screen. Therefore, it becomes possible for a user to review a photographing result while maintaining a state that allows the user to photograph promptly.

Japanese Patent Application, Publication No. 2001-117163 discloses a technology relating to an image capture apparatus that displays a mini photographing review image on a portion of a display screen while displaying a live view image.

SUMMARY OF THE INVENTION

An image apparatus according to a first aspect of the present invention includes: an image capture section that captures an image of a subject; a live view image display section that sequentially displays captured images that are sequentially outputted from the image capture section on a display screen as a live view image; a review image display section that, in a case of photography and recording being directed, displays a captured image for recording outputted from the image capture section as a first review image on a portion of the display screen in a state of displaying the live view image; a photographing result evaluation section that evaluates a photographing result based on the captured image for recording outputted from the image capture section according to a direction to photograph and record; and a display control section that performs display control to make a display form of the first review image different according to an evaluation result by the photographing result evaluation section.

An image method according to a second aspect of the present invention includes: a live view image display step that sequentially displays captured images that are sequentially outputted from an image capture section that captures an image of a subject on a display screen as a live view image; a review image display step that, in a case of photography and recording being directed, displays a captured image for recording outputted from the image capture section as a first review image on a portion of the display screen in a state of displaying the live view image; a photographing result evaluation step that evaluates a photographing result based on the captured image for recording outputted from the image capture section according to a direction to photograph and record; and a display control step that performs display control to make a display form of the first review image different according to an evaluation result by the photographing result evaluation step.

A storage medium according to a third aspect of the present invention is a non-transitory storage medium encoded with a computer-readable program that enables a computer to execute: a live view image display function that sequentially displays captured images that are sequentially outputted from an image capture section that captures an image of a subject on a display screen as a live view image; a review image display function that, in a case of photography and recording being directed, displays a captured image for recording outputted from the image capture section as a first review image on a portion of the display screen in a state of displaying the live view image; a photographing result evaluation function that evaluates a photographing result based on the captured image for recording outputted from the image capture section according to a direction to photograph and record; and a display control function that performs display control to make a display form of the first review image different according to an evaluation result by the photographing result evaluation function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 8A, 8B, 8C and 8D provides views showing specific examples (third embodiment) of a display form upon photographing.

DETAILED DESCRIPTION OF THE INVENTION

In the following, an embodiment of the present invention is described with reference to the drawings.

First Embodiment

Figure 1:
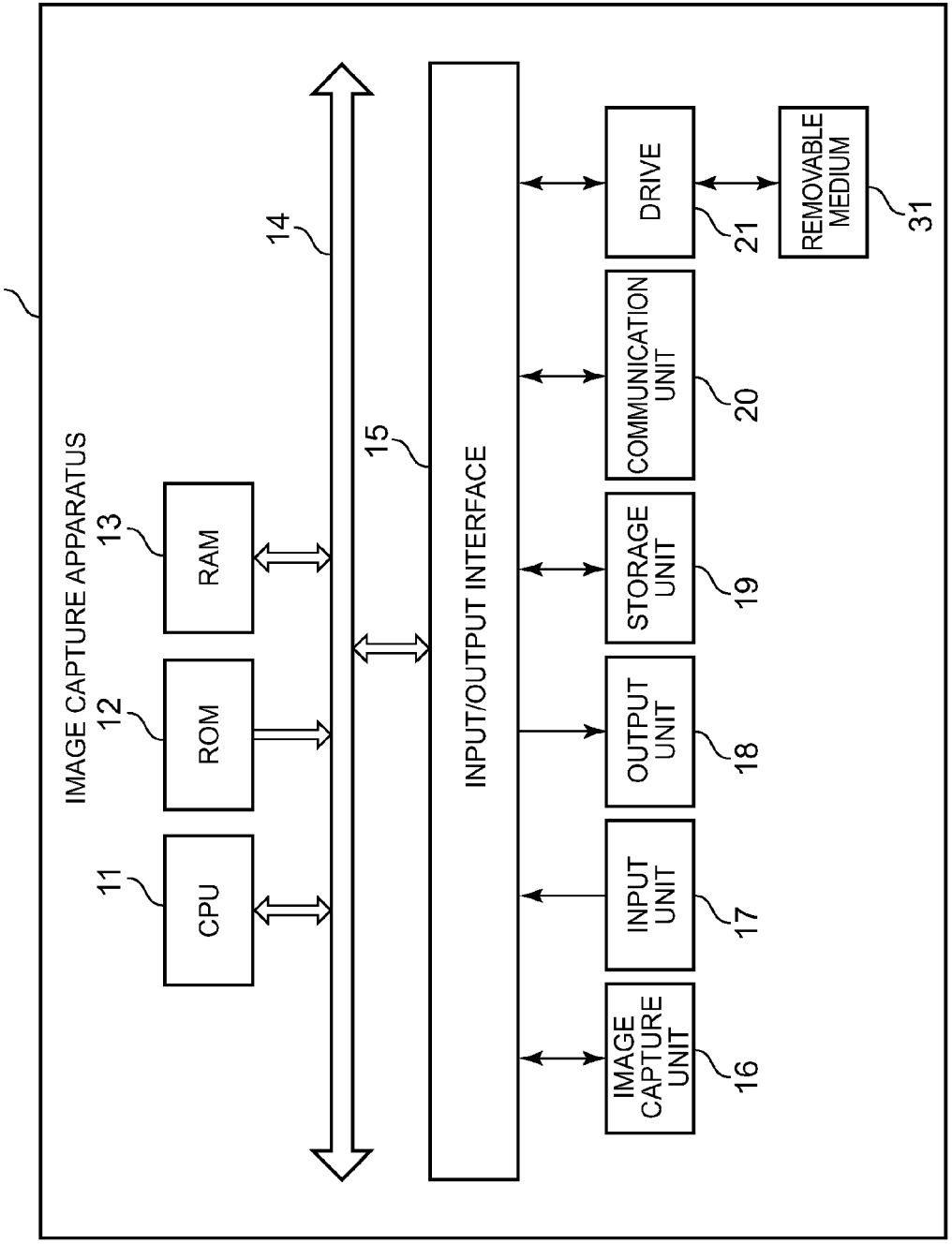
FIG. 1 is a block diagram showing a hardware configuration of an image capture apparatus according to an embodiment of the present invention.

FIG. 1 is a block diagram showing a hardware configuration of an image capture apparatus 1 according to an embodiment of the present invention.

The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an Input/Output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13. Furthermore, an output signal of the image capture unit 16 is inputted to the CPU 11. Data indicated by the output signal of the image capture unit 16 is hereinafter referred to as "data of a captured image".

Furthermore, the CPU 11 executes processing of consecutively displaying a captured image based on data of a plurality of images outputted consecutively from the image capture unit 16. In other words, the CPU 11 has memory (RAM 13, etc.) to temporarily store data of captured images sequentially outputted from the image capture unit 16 while an image capture operation at the image capture unit 16 continues, as well as reading the data of captured images temporarily stored so as to execute live view display that displays an image on a display of the output unit 18. Hereinafter, an image displayed on the display of the output unit 18 in the live view display is referred to as "live view image". It should be noted that the live view image is displayed on an entire display area on the display of the output unit 18.

Furthermore, based on the data of captured images captured according to a user's direction for photographing and recording by the pressing of a shutter button, etc., the CPU 11 executes processing of displaying a mini photographing review image on which a live view image is superimposed (first review image) and processing of displaying a review image displayed by being switched with a live view image (second review image).

Here, the review image refers to an image that displays a photographing result generated from the data of captured images that the user directed for photographing and recording, and is displayed on an entire display area on the display of the output unit 18, similarly to the live view image. Furthermore, the mini photographing review image refers to an image that displays a photographing result generated from the data of captured images that the user directed for photographing and recording, and is displayed on a portion of a display area of the display of the output unit 18 in a size smaller than the review image. In the present embodiment, the mini photographing review image is superimposed on the live view image so as to be displayed with the live view image simultaneously.

Furthermore, the CPU 11 executes a program for photographing result evaluation processing (described later) stored in the ROM 12, etc., and, based on the data of captured images that the user directs for photographing and recording, judges whether failure in photography caused by camera shake (blurring caused by hand), subject motion blur, or defocusing occurs in a captured image (hereinafter, referred to as "success or failure in photography" as appropriate). Then, the CPU 11 displays the mini photographing review image or the review image in a displaying form in which a judgment result from the photographing result evaluation processing can be identified.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Data indicated by such an output signal of the image capture unit 16 is supplied to the CPU 11, RAM 13, and the like as appropriate.

The input unit 17 is configured by various buttons such as a power button, a shutter button, and the like, and inputs a variety of information in accordance with direction operations by the user.

The output unit 18 is configured by the display unit, a speaker, and the like, and outputs images and sound.

The storage unit 19 is configured with hard disk, DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Figure 2:
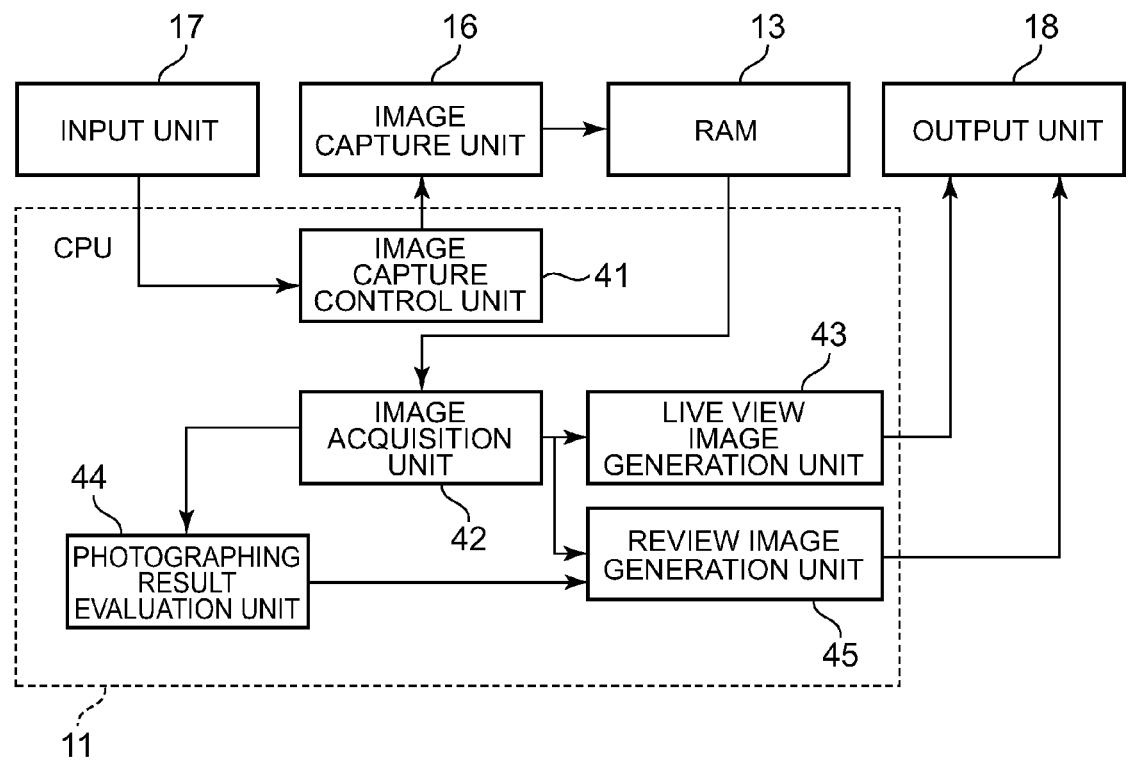
FIG. 2 is a functional block diagram showing a functional configuration for executing photographing result evaluation processing among the functional configurations of the image capture apparatus of FIG. 1.

FIG. 2 is a functional block diagram showing a functional configuration for executing photographing result evaluation processing among the functional configurations of the image capture apparatus 1.

The photographing result evaluation processing refers to a sequence of processing from judging whether it is success or failure in photography for the data of captured images captured by a user's direction in a photographing mode for photography to displaying a mini photographing review image or a review image in a display form according to the judgment result.

When the photographing result evaluation processing is executed, an image capture control unit 41, an image acquisition unit 42, a live view image generation unit 43, a photographing result evaluation unit 44, and a review image generation unit 45 function in the CPU 11.

The image capture control unit 41 sets an image capture condition according to various types of operations to the input unit 17 and controls an image capture operation by the image capture unit 16 based on the image capture condition thus set. Furthermore, the image capture control unit 41 sequentially stores data of captured images outputted from the image capture unit 16 as a live view image in the RAM 13. Moreover, when the shutter button is pressed, and thus photographing and recording (recording an image of a photographic target) are directed, the image capture control unit 41 stores data of captured images outputted from the image capture unit 16 as data of images generated by the user's direction of photographing and recording in the RAM 13 and the storage unit 19.

The image acquisition unit 42 acquires the data of captured images stored in the RAM 13 as a live view image and outputs it to the live view image generation unit 43. Furthermore, the image acquisition unit 42 acquires the data of captured images stored in the RAM 13 as the data of captured images generated by the user's direction of photographing and recording, and outputs it in the photographing result evaluation unit 44 and the review image generation unit 45.

The live view image generation unit 43 generates data for display of a live view image (more specifically, data of a live view image that is rasterized for display) based on data of a live view image and outputs (displays) the data for display of the live view image thus generated to the output unit 18.

The photographing result evaluation unit 44 executes the photographing result evaluation processing and judges whether photography succeeds or fails based on the data of captured images inputted from the image acquisition unit 42 (the data of captured images generated by the user's direction of photographing and recording). It should be noted that, in the present embodiment, the photographing result evaluation unit 44 judges a captured image as "failure in photography" if at least one of the following conditions among camera shake, subject motion blur, a state of a subject as a human closing eyes (hereinafter, referred to as "closed eyes"), defocusing, and mismatch of exposure time (for example, overexposure, or underexposure) (hereinafter, referred to as "photography failure factor"). In other words, in the present embodiment, the photographing result evaluation unit 44 specifies a content of the photography failure factor in addition to the success or failure in photography.

On the other hand, the photographing result evaluation unit 44 judges the captured image as "success in photography" if none of the photography failure factors occur.

The review image generation unit 45 generates data for display of a review image or a mini photographing review image (more specifically, data of a review image or a mini photographing review image that is rasterized for display) based on data of an image generated by the user's direction of photographing and recording, and outputs (displays) the data of the review image or the mini photographing review image thus generated to the output unit 18.

At this time, the review image generation unit 45 performs control to display a review image or a mini photographing review image in a display form according to a result of the photographing result evaluation processing in accordance with a display condition for the review image or the mini photographing review image that is set beforehand. More specifically, if any of the photography failure factors occurs in a captured image, the review image generation unit 45 sets the mini photographing review image to be a display form which indicates that a photography failure factor is occurring. Furthermore, if any of the photography failure factors occurs in a captured image, the review image generation unit 45 sets the review image to be a display form which indicates that a part in which a photography failure factor occurs is specified therein.

FIG. 3 provides views for explaining display forms of a mini photographing review image and a review image in a specific form of the photography failure factors (camera shake, subject motion blur, closed eyes, defocusing, or mismatch of exposure amount). It should be noted that, in FIG. 3, images of small size represent a mini photographing review image and images of large size represents a review image.

Figure 3A:
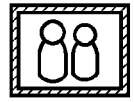
FIGS. 3A, 3B, 3C, 3D and 3E provides views for explaining display forms of a mini photographing review image and a review image in a specific form of photography failure factors.
Figure 3A:
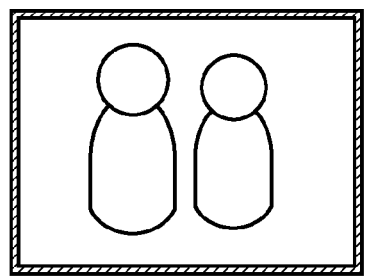

FIG. 3A is a view for explaining a display form of camera shake.

The photographing result evaluation unit 44 detects camera shake based on a motion vector, etc., in data of a captured image, for example. Then, when camera shake is detected, as shown in FIG. 3A, the review image generation unit 45 refers to a display condition that is stored in the ROM 12 and the like and set beforehand, so as to display an outer frame of a mini photographing review image with a color indicating camera shake.

It should be noted that, in the case of camera shake, since the entire captured image is blurred, a part in which a photography failure factor occurs is not specified.

Figure 3B:
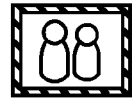
Figure 3B:
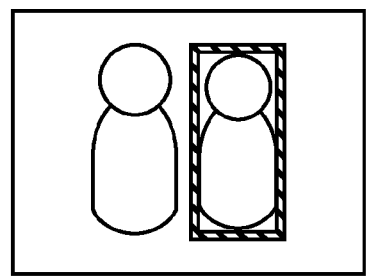

FIG. 3B is a view for explaining a display form of subject motion blur. The photographing result evaluation unit 44 detects subject motion blur based on a motion vector, etc., in data of a captured image, for example. Then, when subject motion blur is detected, as shown in FIG. 3B, the review image generation unit 45 refers to a display condition that is set beforehand so as to display an outer frame of a mini photographing review image with a color indicating subject motion blur. Furthermore, in the case of subject motion blur, since an image of a specific subject is blurred, in the present embodiment, a part in which a photography failure factor (subject motion blur) occurs (for example, a rectangle enclosing a subject) in the review image is displayed with the same color as that of the outer frame.

Figure 3C:
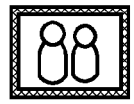
Figure 3C:
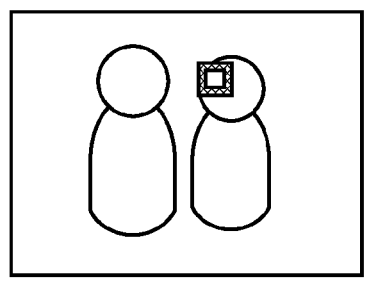

FIG. 3C is a view for explaining a display form of closed eyes. The photographing result evaluation unit 44 executes face detection processing on data of a captured image, for example, and detects closed eyes by judging a degree of eye opening on a face detected. Then, when closed eyes is detected, as shown in FIG. 3C, the review image generation unit 45 refers to a display condition that is set beforehand so as to display an outer frame of a mini photographing review image with a color indicating closed eyes. Furthermore, in the case of closed eyes, since it is possible to detect an eye that is closed, in the present embodiment, a part in which a photography failure factor (closed eyes) occurs in a review image (for example, a rectangle enclosing an eye closed) is displayed with the same color as that of the outer frame.

Figure 3D:
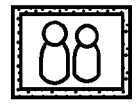
Figure 3D:
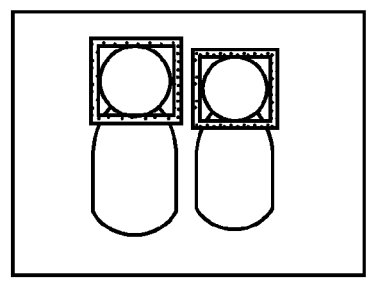

FIG. 3D is a view for explaining a display form of defocusing. The photographing result evaluation unit 44 specifies a main subject such as a human in a captured image, for example, and, based on edge strength of an image of the main subject, detects whether the main subject is defocused (defocusing).

Then, when defocusing is detected, as shown in FIG. 3D, the review image generation unit 45 refers to a display condition that is set beforehand so as to display an outer frame of a mini photographing review image with a color indicating defocusing. Furthermore, in the case of defocusing, since it is possible to specify a main subject that is defocused, in the present embodiment, a part in which a photography failure factor (defocusing) occurs in a review image (for example, a rectangle enclosing the main subject) is displayed in the same color as that of the outer frame.

Figure 3E:
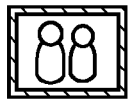
Figure 3E:
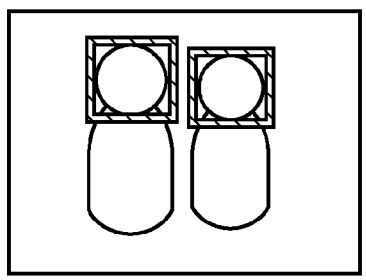

FIG. 3E is a view for explaining a display form of mismatch of exposure amount. The photographing result evaluation unit 44 specifies a main subject such as a human in a captured image, for example, and, based on brightness of an image of the main subject, detects exposure state of the main subject.

Then, when overexposure or underexposure of the main subject is detected, as shown in FIG. 3E, the review image generation unit 45 refers to a display condition that is set beforehand so as to display an outer frame of a mini photographing review image in a color indicating mismatch of exposure amount. Furthermore, in the case of mismatch of exposure amount, since it is possible to identify a main subject for which exposure amount is mismatch, in the present embodiment, a part in which a photography failure factor (mismatch of exposure amount) in a review image occurs (for example, a rectangle enclosing the main subject) is displayed in the same color as that of the outer frame.

FIG. 4 provides views showing specific examples of a display form upon photographing.

Figure 4A:
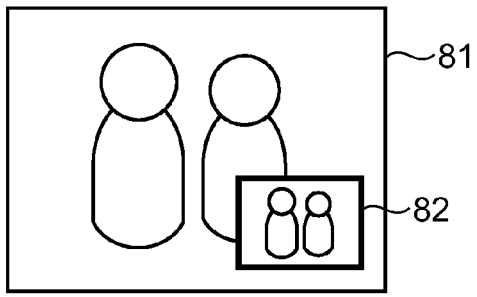
FIGS. 4A and 4B provides views showing specific examples (first embodiment) of a display form upon photographing.
Figure 4B:
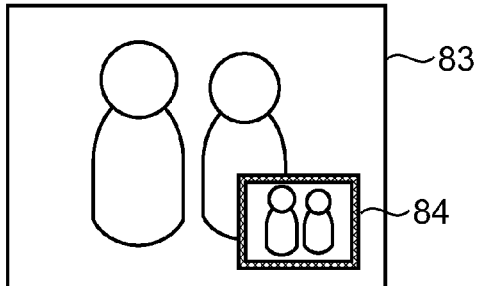
Figure 4B:
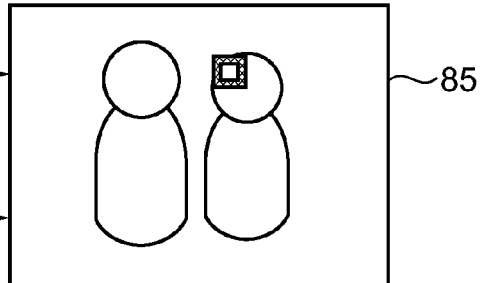
Figure 4B:
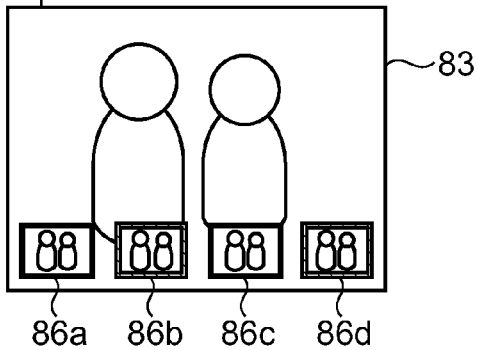

FIGS. 4A and 4B are views showing a state in which a mini photographing review image and a live view image are displayed on a display of the output unit 18.

FIG. 4A shows a live view image 81 and a mini photographing review image 82 in a case of success in photography. The live view image 81 is displayed substantially on an entire display of the output unit 18, and the mini photographing review image 82 of a size smaller than the live view image 81 is displayed so as to be superimposed on the live view image 81 on a portion of the display (here, it is a small area located at the lower right). It should be noted that, in the case of success in photography, the outer frame of the mini photographing review image 82 is displayed in a color indicating success in photography.

FIG. 4B shows a live view image 83 and a mini photographing review image 84 in a case of failure in photography. It should be noted that, in FIG. 4B, (A) shows a state in which the mini photographing review image 84 is displayed in a superimposed manner at the lower right on the live view image 83, (B) shows a state in which a part in which a photography failure factor occurs is displayed in the review image 85; and (C) shows a state in which a plurality of mini photographing review images is displayed in a superimposed manner at the bottom on the live view image. Furthermore, FIG. 4B shows an example of a case of the photography failure factor being closed eyes. In the example shown in FIG. 4B, the outer frame of the mini photographing review image 84 is displayed in a color indicating failure in photography due to closed eyes.

Furthermore, in (A) of FIG. 4B, in a state in which the mini photographing review image 84 is displayed in a superimposed manner at the lower right in the live view image 83, an operation on a predetermined button (for example, a "Δ" button representing an upper direction of arrow keys) of the input unit 17 for a predetermined period of time (for example, three seconds) since photographing is received. Then, when a user operates a predetermined button, the review image generation unit 45 magnifies the mini photographing review image 84 so as to display it as the review image 85 on an entire display in place of the live view image 83. At this time, the review image generation unit 45 specifies a part in which closed eyes occurs in the review image 85 with a rectangle in a color indicating closed eyes.

In this way, the state of failure in photography is identified and displayed by the mini photographing review image 84, and a part in which a photography failure factor occurs is displayed on a larger image by the review image 85. Therefore, it is possible to easily identify not only the state of failure in photography, but also the photography failure factor and the part in which the photography failure factor occurs.

Furthermore, in a case in which a plurality of images is captured (for example, in a case in which photographing and recording are performed by way of continuous shooting), as shown in (C) of FIG. 4B, the review image generation unit 45 displays a plurality of mini photographing review images 86a to 86d at the lower portion of the live view image. Then, the photographing result evaluation unit 44 judges success or failure in photography for each of the plurality of mini photographing review images 86a to 86d thus displayed and the review image generation unit 45 displays outer frames of the mini photographing review images 86a to 86d in colors according to judgment results.

Then, when the user selects any of the mini photographing review images 86a to 86d and operates a predetermined button of the input unit 17 (for example, the "Δ" button representing an upper direction of arrow keys), as shown in (B) of FIG. 4B, the review image generation unit 45 magnifies the mini photographing review image thus selected so as to display it as the review image 85 on an entire display in place of the live view image 83.

Figure 5:
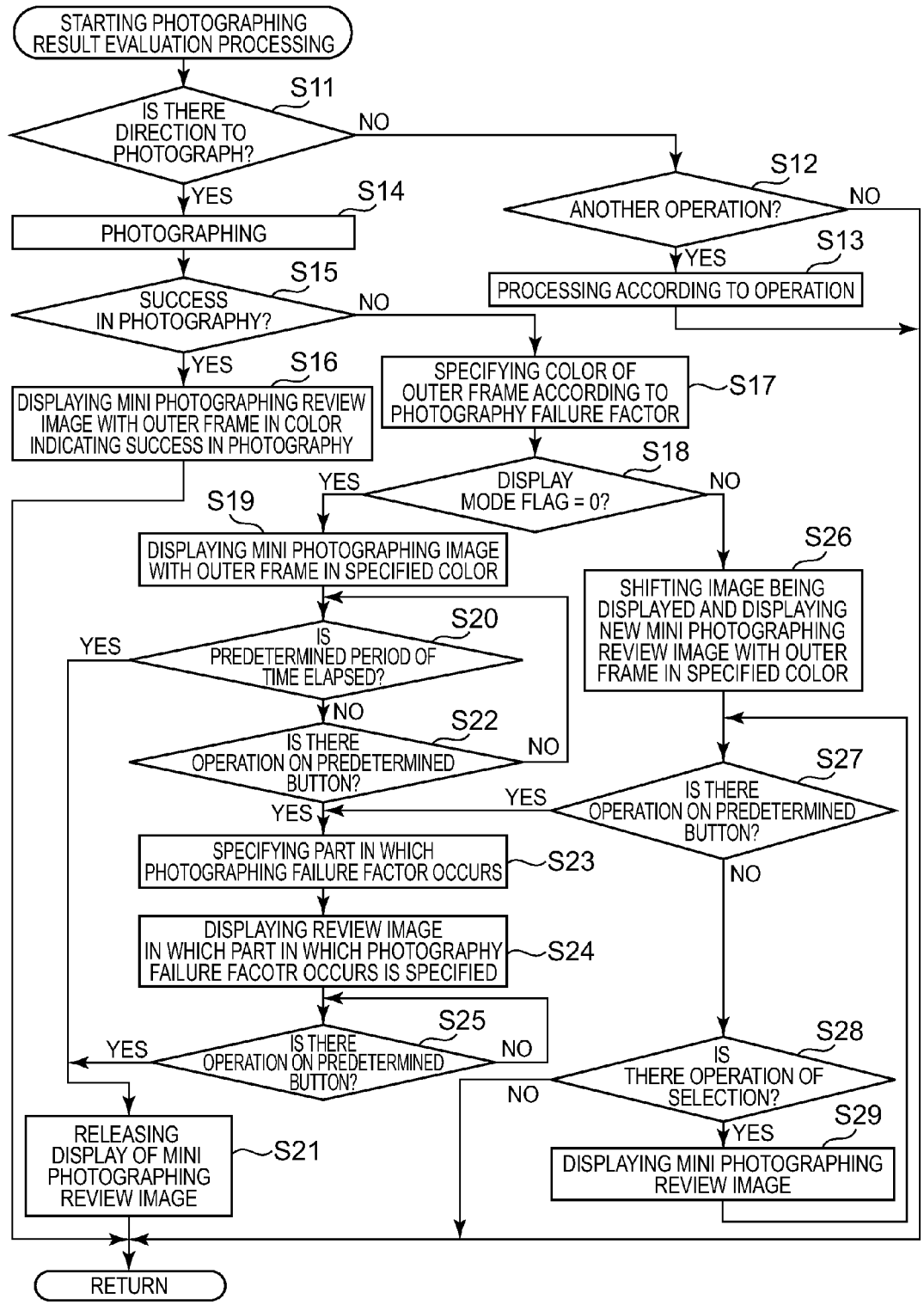
FIG. 5 is a flowchart explaining a flow of photographing result evaluation processing executed by the image capture apparatus in FIG. 1 having the functional configuration of FIG. 2.

Next, with reference to FIG. 5, photographing result evaluation processing is explained which is executed by the image capture apparatus 1 with the functional configuration shown in the abovementioned FIG. 2.

FIG. 5 is a flowchart explaining a flow of the photographing result evaluation processing executed by the image capture apparatus in FIG. 1 having the functional configuration of FIG. 2.

The photographing result evaluation processing starts when an operation by a user directing the input unit 17 to photograph is made and a sequence of processing as follows is executed.

In Step S11, the image capture control unit 41 judges whether an operation by a user directing to photograph is made.

In a case in which the operation of directing to photograph is made, it is judged as YES in Step S11 and the processing advances to Step S14.

On the other hand, in a case in which the operation of directing to photograph is not made, it is judged as NO in Step S11 and the processing advances to Step S12.

In Step S12, the image capture control unit 41 judges whether an operation other than the operation of directing the image capture apparatus 1 to photograph (for example, a zooming operation, setting manual mode, etc.) is made.

In a case in which an operation other than the operation of directing the image capture apparatus 1 to photograph is not made, it is judged as NO in Step S12 and the processing returns to Step S11.

On the other hand, in a case in which an operation other than the operation of directing the image capture apparatus 1 to photograph (for example, a zooming operation, setting manual mode, etc.) is made, it is judged as YES in Step S12 and the processing advances to Step S13.

In Step S13, the image capture control unit 41 executes processing according to the operation and the processing returns to Step S11.

In Step S14, the image capture control unit 41 has the RAM 13, etc., store data of captured images as data of images generated by the user's direction of photographing and recording.

In Step S15, the photographing result evaluation unit 44 judges whether it is success or failure in photography for the data of images generated by the user's direction of photographing and recording.

For the data of images generated by the user's direction of photographing and recording, in the case of success in photography, it is judged as YES in Step S15 and the processing advances to Step S16.

On the other hand, for the data of images generated by the user's direction of photographing and recording, in the case of failure in photography, it is judged as NO in Step S15 and the processing advances to Step S17.

In Step S16, the review image generation unit 45 displays a mini photographing review image having an outer frame in a color indicating success in photography, and the processing returns to Step S11.

In Step S17, the review image generation unit 45 specifies the color of the outer frame of the mini photographing review image according to a photography failure factor judged by the photographing result evaluation unit 44.

In Step S18, the review image generation unit 45 judges whether a display mode of the mini photographing review image is set to be a mode of displaying a single mini photographing review image (display mode flag=0) or a mode of displaying a plurality of mini photographing review images (display mode flag=1).

It should be noted that the display mode flag is a flag that is set by the user operating the input unit 17 and a flag to identify whether to display a plurality of mini photographing review images on the display of the output unit 18. In a case of "0", the display mode flag indicates that a single mini photographing review image is displayed on the display, and in a case of "1", the display mode flag indicates that a plurality of mini photographing review images is displayed on the display.

In Step S18, when the display mode of the mini photographing review image is set to be the mode of displaying a single mini photographing review image (in the case of the display mode flag=0), the processing advances to Step S19.

On the other hand, when the display mode of the mini photographing review image is set to be the mode of a plurality of mini photographing review images (in the case of the display mode flag=1), the processing advances to Step S26.

In Step S19, the review image generation unit 45 displays the mini photographing review image having an outer frame with a color specified for the data of the captured images captured in Step S14.

At this moment, the mini photographing review image is displayed so as to be superimposed on the live view image (refer to (A) of FIG. 4B).

In Step S20, the review image generation unit 45 judges whether a predetermined period of time elapses since photographing in a state of displaying the mini photographing review image.

In a case in which a predetermined period of time elapses since photographing in a state of displaying the mini photographing review image, it is judged as YES in Step S20 and the processing advances to Step S21.

On the other hand, in a case in which a predetermined period of time has not elapsed since photographing in a state of displaying the mini photographing review image, it is judged as NO in Step S20 and the processing advances to Step S22.

In Step S21, the review image generation unit 45 releases display of the mini photographing review image, a result of which it enters the state in which only the live view image is displayed.

Thereafter, the processing returns to Step S11.

In Step S22, the review image generation unit 45 judges whether a predetermined button (for example, the "Δ" button representing an upper direction of arrow keys) is operated.

In a case in which a predetermined button (for example, the "Δ" button representing an upper direction of arrow keys) is not operated, it is judged as NO in Step S22 and the processing returns to Step S20.

On the other hand, in a case in which a predetermined button (for example, the "Δ" button representing an upper direction of arrow keys) is operated, it is judged as YES in Step S22 and the processing returns to Step S23.

In Step S23, the review image generation unit 45 specifies a portion that is displayed as a part in which a photography failure factor occurs.

In Step S24, the review image generation unit 45 displays, on an entire screen, the review image in which the part in which a photography failure factor occurs is specified.

In Step S25, the review image generation unit 45 judges whether a predetermined button (for example, the "Δ" button representing an upper direction of arrow keys) is operated.

In a case in which a predetermined button (for example, the "Δ" button representing an upper direction of arrow keys) is not operated, it is judged as NO in Step S25 and the processing returns to Step S25.

On the other hand, in a case in which a predetermined button (for example, the "Δ" button representing an upper direction of arrow keys) is operated, it is judged as YES in Step S25 and the processing advances to Step S21.

In Step S26, the review image generation unit 45 shifts the mini photographing review images that are already displayed and adds the mini photographing review images having outer frames with colors specified for the data of captured images captured in Step S14 for display (refer to (C) of FIG. 4B). Here, the plurality of mini photographing review images that are already displayed is shifted by one image to the left so that a mini photographing review image of an image that is newly photographed is displayed at an empty area.

In Step S27, the review image generation unit 45 judges whether a predetermined button (for example, the "Δ" button representing an upper direction of arrow keys) is operated.

In a case in which a predetermined button (for example, the "Δ" button representing an upper direction of arrow keys) is not operated, it is judged as NO in Step S27 and the processing advances to Step S28.

On the other hand, in a case in which a predetermined button (for example, the "Δ" button representing an upper direction of arrow keys) is operated, it is judged as YES in Step S27 and the processing advances to Step S23.

In Step S28, the review image generation unit 45 judges whether an operation of selecting a mini photographing review image (for example, an operation on a button representing a right/left direction of arrow keys) is made.

In a case in which the operation of selecting a mini photographing review image (the operation of a button representing a right/left direction of arrow keys) is not made, it is judged as NO in Step S28 and the processing returns to Step S11.

On the other hand, in a case in which the operation of selecting a mini photographing review image (the operation of a button representing a right/left direction of arrow keys) is made, it is judged as YES in Step S28 and the processing advances to Step S29.

In Step S29, the review image generation unit 45 displays the mini photographing review image selected by the operation in Step S28.

Thereafter, the processing returns to Step S27.

It should be noted that, it may be configured so that, in the present embodiment, in a case of success in photography, a mini photographing review image is displayed, and in a case of failure in photography, a mini photographing review image is not displayed and a review image is displayed on an entire screen. Furthermore, it may be configured so that, at this moment, a part in which a photography failure factor occurs is specified in the review image in the display form shown in FIG. 3, for example. With such a configuration, it can be configured such that, in the case of success in photography, a state in which display of a live view image continues so as to allow to photograph and record immediately, and in the case of failure in photography, a part in which a photography failure factor occurs is displayed. With such a configuration, it is possible for the user to properly judge whether to newly photograph or to photograph again depending on success or failure in photography.

As described above, the image capture apparatus 1 according to the present embodiment includes: the image capture unit 16; the live view image generation unit 43; the photographing result evaluation unit 44, and the review image generation unit 45.

The image capture unit 16 captures an image of a subject.

The live view image generation unit 43 sequentially displays on a display screen a captured image that is sequentially outputted from the image capture unit 16 as a live view image.

In a case of photography and recording being directed, the review image generation unit 45 displays a captured image for recording outputted from the image capture unit 16 as a first review image on a portion of a display screen in a state of displaying the live view image.

The photographing result evaluation unit 44 evaluates a photographing result based on the captured image for recording outputted from the image capture unit 16 according to a direction for photographing and recording.

The review image generation unit 45 performs display control to make a display form of the first review image different according to the evaluation result by the photographing result evaluation unit 44.

With such a configuration, it can be configured such that the evaluation result of photography is displayed as a display form of the first review image while a state in which display of the live view image continues so as to allow photographing and recording immediately.

With such a configuration, it is possible for the user to properly judge whether to newly photograph or to photograph again depending on the evaluation result of photography.

Therefore, it can be configured so that the display function of the mini photographing review image while displaying the live view image is set to be appropriate based on the judgment of the photographing result by the user.

Furthermore, the photographing result evaluation unit 44 judges whether it is success or failure in photography.

With such a configuration, it is possible for the user to properly judge whether to newly photograph or to photograph again depending on success or failure in photography.

Furthermore, the review image generation unit 45 sets a frame of the first review image to at least either a display form in which the frame of the first review image has a color according to the evaluation result or a display form in which the first review image has a color according to the evaluation result.

With such a configuration, on the first review image of a size smaller than that of the live view image, a photographing result is displayed according to the color of the frame of the first review image or the color of the first review image.

Therefore, it is possible to display a photographing result in a manner in which it is easy for a user to understand even with the first review image of a size smaller than that of the live view image.

Furthermore, the review image generation unit 45 displays a captured image for recording as a second review image of a size larger than that of the first review image in place of the live view image on a display screen.

With such a configuration, it is possible not only to display a photographing result by way of the first review image, but also to display the photographing result in a display form in which it is easy for a user to understand with the second review image of larger size.

Furthermore, the review image generation unit 45 switches from the first review image to display the second review image in response to a predetermined operation being performed (for example, the "Δ" button representing an upper direction of arrow keys) while displaying the first review image.

With such a configuration, it is possible for the user to identify an evaluation result of photography promptly by way of the first review image, and also possible to easily identify a specific content of the evaluation result of photography by way of the second review image.

Furthermore, the review image generation unit 45 displays a plurality of the first review images according to a plurality of times of photographing on a display screen, and makes display forms different for each of the plurality of the first review images according to the evaluation result by the photographing result evaluation unit 44.

With such a configuration, it is possible to display the evaluation result of photography in a form in which it is easy for the user to understand the plurality of captured images that are already photographed (for example, captured images photographed by way of continuous shooting).

Furthermore, in a case of judging as failure in photography, the photographing result evaluation unit 44 specifies a photography failure factor.

The review image generation unit 45 selects a display form of the first review image from among a plurality of display forms determined in advance for each of a plurality of factors according to the photography failure factor specified by the photographing result evaluation unit 44.

With such a configuration, it is possible to identify the photography failure factor based on the display form of the first review image.

Furthermore, in a case of judging as success in photography by the photographing result evaluation unit 44, the review image generation unit 45 displays the first review image as an image showing a photographing result on a display screen, and in a case of judging as failure in photography by the photographing result evaluation unit 44, the review image generation unit 45 displays the second review image of a size larger than that of the first review image which is displayed so that a part in which a photography failure factor occurs can be identified in an distinguishable manner, on the display screen as an image showing a photographing result.

It can thereby be configured such that, in the case of success in photography, a state in which display of a live view image continues so as to allow to photograph and record immediately, and in the case of failure in photography, a part in which a photography failure factor occurs is displayed.

With such a configuration, it is possible for the user to properly judge whether to newly photograph or to photograph again depending on success or failure in photography.

Second Embodiment

Next, a second embodiment of the present invention is described.

An image capture apparatus 1 according to the present embodiment differs from that of the first embodiment in the display forms of a mini photographing review image and a review image in a case of failure in photography.

Therefore, descriptions are mainly provided for functional configurations and photographing result evaluation processing of a review image generation unit 45, which are different portions.

Figure 6A:
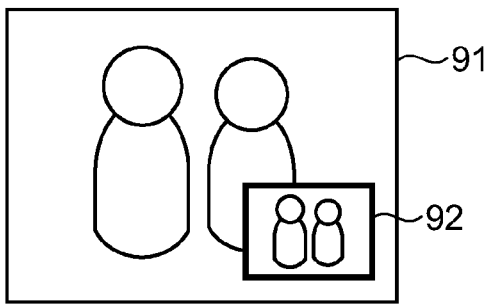
FIGS. 6A and 6B provides views showing specific examples (second embodiment) of a display form upon photographing.
Figure 6B:
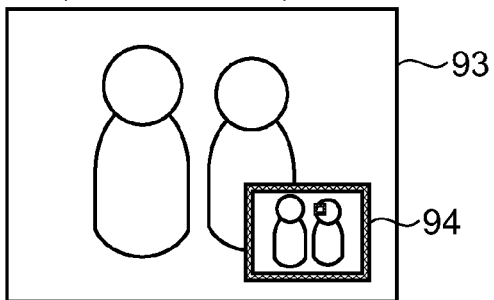
Figure 6B:
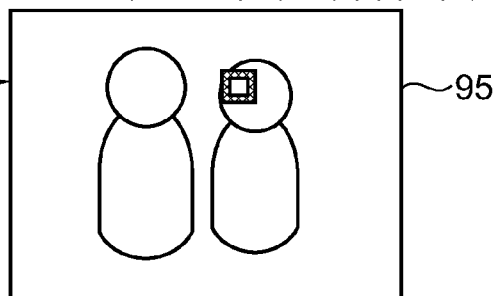

FIG. 6 provides views showing specific examples of a display form upon photographing.

FIGS. 6A and 6B are views showing a state in which a mini photographing review image and a live view image are displayed on a display of the output unit 18.

FIG. 6A shows a live view image 91 and a mini photographing review image 92 in a case of success in photography. The live view image 91 is displayed substantially on an entire display of the output unit 18, and the mini photographing review image 92 of a size smaller than the live view image 91 is displayed so as to be superimposed on the live view image 91 on a part of the display (here, it is a small area located at the lower right). It should be noted that, in the case of success in photography, the outer frame of the mini photographing review image 92 is displayed with a color indicating success in photography, also in the present embodiment, similarly to the first embodiment.

FIG. 6B shows a live view image 93 and a mini photographing review image 94 in a case of failure in photography. It should be noted that, in FIG. 6B, (A) shows a state in which the mini photographing review image 94 are displayed in a superimposed manner at the lower right on the live view image 93, and (B) shows a state in which a part in which a photography failure factor occurs is displayed in the review image 95. Furthermore, FIG. 6B shows an example of a case of the photography failure factor being closed eyes.

As shown in (A) of FIG. 6B, the review image generation unit 45 specifies a portion in which closed eyes occurs with a rectangle in a color indicating closed eyes in the mini photographing review image 94 of a size smaller than that of the live view image 93.

It should be noted that, at this time, the outer frame of the mini photographing review image 94 is displayed in a color indicating closed eyes.

Furthermore, in the present embodiment, by the user operating a predetermined button of the input unit 17 shown in FIG. 1 (for example, a "Δ" button representing an upper direction of arrow keys) within a predetermined period of time since the start of displaying the mini photographing review image 94, the review image generation unit 45 magnifies the mini photographing review image 94 so as to display it as the review image 95 on an entire display in place of the live view image 93. At this moment, in the present embodiment, a part in which a photography failure factor (closed eyes) occurs in the review image 95 (for example, a rectangle enclosing an eye closed) is displayed in a color which is the same as the color of an outer frame according to closed eyes.

With such a configuration, the matter of failure in photography and the part in which a photography failure factor occurs are identified based on the mini photographing review image 94 and displayed. Therefore, it is possible for the user to easily identify the matter of failure in photography, a photography failure factor, and the part in which the photography failure factor occurs, based on the display form of the mini photographing review image 94.

Figure 7:
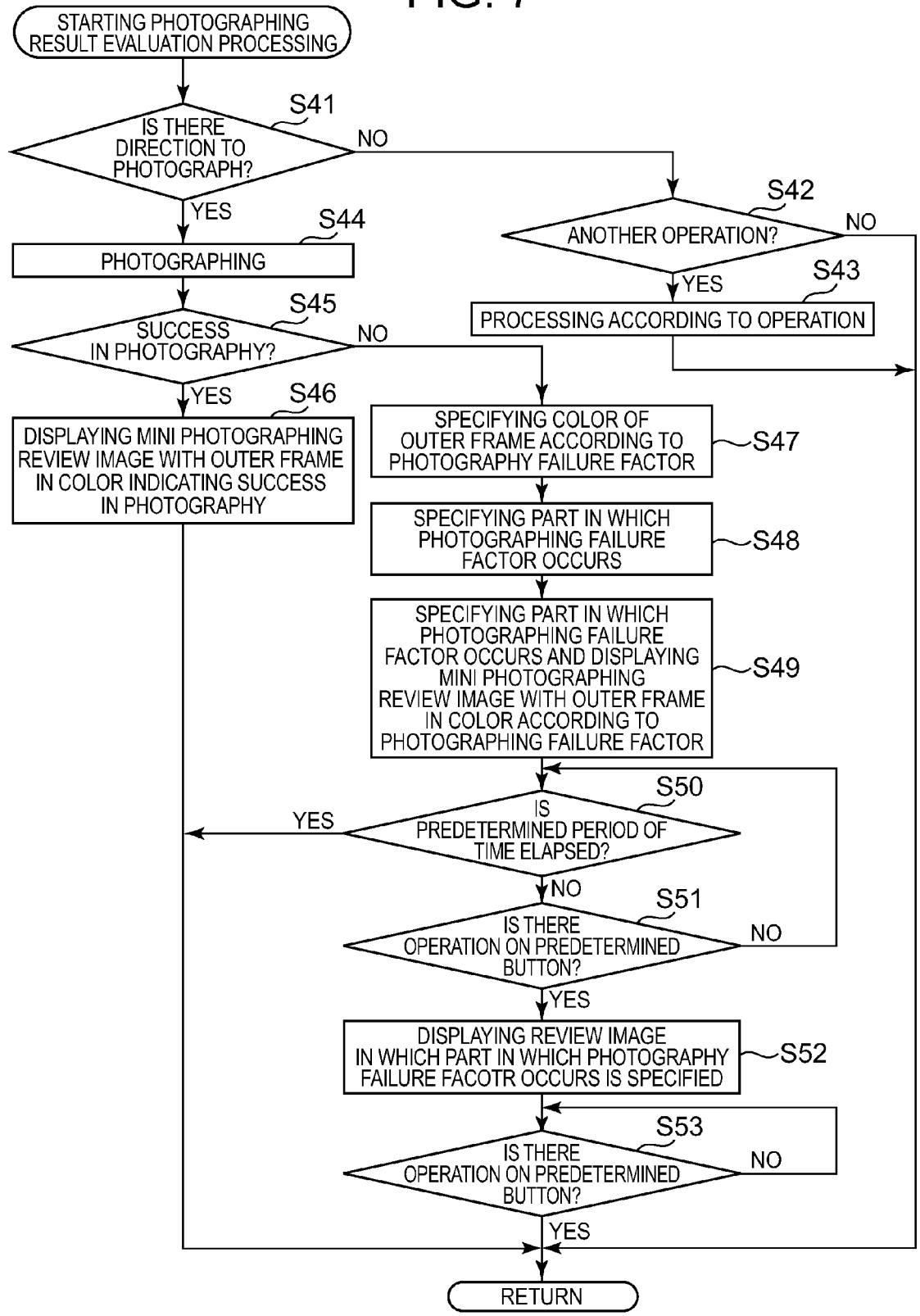
FIG. 7 is a flowchart explaining a flow of photographing result evaluation processing according to the second embodiment of the present invention.

Next, with reference to FIG. 7, photographing result evaluation processing according to the second embodiment is explained.

FIG. 7 is a flowchart explaining a flow of the photographing result evaluation processing according to the second embodiment.

In the photographing result evaluation processing shown in FIG. 7, the processing from Steps S41 to S47 is similar to the processing of Steps S11 to S17 in the photographing result evaluation processing according to the first embodiment shown in FIG. 5.

In Step S41, the image capture control unit 41 judges whether an operation by a user directing to photograph is made.

In a case in which the operation of directing to photograph is made, it is judged as YES in Step S41 and the processing advances to Step S44.

On the other hand, in a case in which the operation of directing to photograph is not made, it is judged as NO in Step S41 and the processing advances to Step S42.

In Step S42, the image capture control unit 41 judges whether an operation other than the operation of directing the image capture apparatus 1 to photograph (for example, a zooming operation, setting manual mode, etc.) is made.

In a case in which an operation other than the operation of directing the image capture apparatus 1 to photograph is not made, it is judged as NO in Step S42 and the processing returns to Step S41.

On the other hand, in a case in which an operation other than the operation of directing the image capture apparatus 1 to photograph (for example, a zooming operation, setting manual mode, etc.) is made, it is judged as YES in Step S42 and the processing advances to Step S43.

In Step S43, the image capture control unit 41 executes processing according to the operation and the processing returns to Step S41.

In Step S44, the image capture control unit 41 has the RAM 13, etc., store data of captured images as data of images generated by the user's direction of photographing and recording.

In Step S45, the photographing result evaluation unit 44 judges whether it is success or failure in photography for the data of images generated by the user's direction of photographing and recording.

For the data of images generated by the user's direction of photographing and recording, in the case of success in photography, it is judged as YES in Step S45 and the processing advances to Step S46.

On the other hand, for the data of images generated by the user's direction of photographing and recording, in the case of failure in photography, it is judged as NO in Step S45 and the processing advances to Step S47.

In Step S46, the review image generation unit 45 displays a mini photographing review image having an outer frame in a color indicating success in photography, and the processing returns to Step S41.

In Step S47, the review image generation unit 45 specifies the color of the outer frame of the mini photographing review image according to a photography failure factor judged by the photographing result evaluation unit 44.

In Step S48, the review image generation unit 45 specifies a portion displayed as a part in which a photography failure factor occurs.

In Step S49, the review image generation unit 45 sets an outer frame to a color according to a photography failure factor and displays on an entire screen a mini photographing review image in which the part in which the photography failure factor occurs is specified.

In Step S50, the review image generation unit 45 judges whether a predetermined period of time has elapsed since photographing in a state of displaying the mini photographing review image.

In a case in which a predetermined period of time has elapsed since photographing in a state of displaying the mini photographing review image, it is judged as YES in Step S50 and the processing returns to Step S41.

On the other hand, in a case in which a predetermined period of time has not elapsed since photographing in a state of displaying the mini photographing review image, it is judged as NO in Step S50 and the processing advances to Step S51.

In Step S51, the review image generation unit 45 judges whether a predetermined button (for example, the "Δ" button representing an upper direction of arrow keys) is operated.

In a case in which a predetermined button (for example, the "Δ" button representing an upper direction of arrow keys) is not operated, it is judged as NO in Step S51 and the processing returns to Step S50.

On the other hand, in a case in which a predetermined button (for example, the "Δ" button representing an upper direction of arrow keys) is operated, it is judged as YES in Step S51 and the processing advances to Step S52.

In Step S52, the review image generation unit 45 displays, on an entire screen, the review image in which the part in which a photography failure factor occurs is specified.

In Step S53, the review image generation unit 45 judges whether a predetermined button (for example, the "Δ" button representing an upper direction of arrow keys) is operated.

In a case in which a predetermined button (for example, the "Δ" button representing an upper direction of arrow keys) is not operated, it is judged as NO in Step S53 and the processing returns to Step S53.

On the other hand, in a case in which a predetermined button (for example, the "Δ" button representing an upper direction of arrow keys) is operated, it is judged as YES in Step S53 and the processing returns to Step S41.

It should be noted that, in the present embodiment, a plurality of the mini photographing review images may be displayed in a superimposed manner at the lower portion of the live view image, similarly to (C) of FIG. 4B according to the first embodiment.

As described above, in the image capture apparatus 1 according to the present embodiment, in a case of judging as failure in photography by the photographing result evaluation unit 44, the review image generation unit 45 displays the part in which the photography failure factor occurs in the first review image in an distinguishable manner.

With such a configuration, it is possible for the user to easily identify the matter of failure in photography and the part in which the photography failure factor occurs, based on the display form of the first review image.

Third Embodiment

Next, a third embodiment of the present invention is explained.

In the present embodiment, display control of a mini photographing review image and display control of a review image can be switched.

FIG. 8 provides views showing specific examples of a display form upon photographing.

In the present embodiment, it is configured such that a display mode in which a mini photographing review image of a size smaller than a live view image is displayed so as to be superimposed on a live view image 91 (hereinafter, referred to as "mini photographing review display mode") and a display mode of displaying only a review image on an entire display screen (hereinafter, referred to as "entire screen review display mode") are switched.

FIGS. 8A and 8B show examples of a display form in a case of success in photography. In other words, FIG. 8A shows a state in which a mini photographing review image 102 is superimposed on a live view image 101 in the mini photographing review display mode. FIG. 8B shows a state in which the mini photographing review image 102 is magnified and displayed as a review mage 103 on an entire screen in the entire screen review display mode.

FIGS. 8C and 8D show examples of a display form in a case of failure in photography. In other words, FIG. 8C shows a state in which a mini photographing review image 105 with a color of an outer frame set as a color for identifying a photography failure factor is superimposed on a live view image 104, in the mini photographing review display mode. FIG. 8D shows a state in which a review image 106 in which a part in which a photography failure factor occurs is identified is displayed on an entire screen in the entire screen review display mode.

In the present embodiment, the mini photographing review display mode and the entire screen review display mode can be switched by the switching operation from the input unit 17.

In the present embodiment, on the mini photographing review image 102 shown in FIG. 8A, an outer frame thereof is displayed in a color indicating success in photography. Furthermore, on the mini photographing review image 105 shown in FIG. 8C, an outer frame thereof is displayed in a color indicating failure in photography due to closed eyes of a subject. On the review image 106 shown in FIG. 8D, control to display an outer frame in either color is not performed and a part in which a photography failure factor (closed eyes) occurs is shown.

With such a configuration, it is possible to arbitrarily select to display either the mini photographing review image or the review image upon photographing. Therefore, it can be configured so as to set a display form in which a user easily identifies a photography failure factor and a part in which the photography failure factor occurs according to the preference of the user.

Furthermore, in the present embodiment, it is configured so that the display form showing that a photography failure factor occurs in a color of the outer frame of the mini photographing review image in the case of failure in photography (refer to (A) of FIG. 4B) and the display form specifying a part in which a photography failure factor occurs in the mini photographing review image (refer to (A) of FIG. 6B) can be switched by the switching operation from the input unit 17.

With such a configuration, in the case of displaying failure in photography by the mini photographing review image, it is possible for the user to arbitrarily select the display form indicating failure in photography according to the size of a display, etc. Therefore, it can be configured so as to set a display form in which a user easily identifies a photography failure factor and a part in which the photography failure factor occurs while maintaining display of a live view image upon photographing.

As described above, in the image capture apparatus 1 of the present embodiment, the review image generation unit 45 switches in response to a switching operation between a setting of displaying the first review image and a setting of display the second review image for an image showing a photographing result upon photographing and selects a display form of the first review image or the second review image based on the setting of displaying in response to the switching operation according to an evaluation result by the photographing result evaluation unit 44.

With such a configuration, it is possible to arbitrarily select to display either the first review image or the second review image upon photographing.

Therefore, it can be configured so as to set a display form in which a user easily identifies a photography failure factor and a part in which the photography failure factor occurs according to the preference of the user.

Furthermore, in the case of judging as failure in photography by the photographing result evaluation unit 44 and a display form of the first review image being configured to differ according to a judgment result by the photographing result evaluation unit 44, the review image generation unit 45 switches in response to a switching operation between a display form in which a frame of the first review image is set to a color according to an evaluation result and a display form in which a part in which a photography failure factor occurs in the first review image is displayed in an distinguishable manner.

With such a configuration, in the case of displaying failure in photography by the first review image, it is possible for the user to arbitrarily select a display form indicating failure in photography according to the size of a display, etc.

Therefore, it can be configured so as to set a display form in which a user easily identifies a photography failure factor and a part in which the photography failure factor occurs while maintaining display of a live view image upon photographing.

It should be noted that the present invention is not to be limited to the aforementioned embodiment, and that modifications, improvements, etc. within a scope that can achieve the object of the present invention are also included in the present invention.

For example, in the abovementioned embodiment, although it is described that the matter of failure in photography is identified and displayed with the mini photographing review image or a color of the outer frame of the review image, it may be configured such that the outer frame is rendered transparent, (i.e., without an outer frame) in the case of success in photography so as to perform display for emphasizing identification more. Furthermore, it may be configured such that the mini photographing review image or the review image is corrected for display (for example, correcting the image in sepia or by hatching for display) so as to indicate failure in photography. Furthermore, it can be configured so as to identify and display a photography failure factor as well as failure in photograph by setting a color of the mini photographing review image or the review image differently according to a photography failure factor (for example, setting a color by correcting an image with the ratio of colors according to a photography failure factor).

Furthermore, in the abovementioned embodiment, although the evaluation of a photographing result is performed based on success or failure in photography, an operational effect can be anticipated in which a result of photographing in a case of aiming at producing a dynamic effect of an image by way of camera shake or a tree branch as a subject swaying on purpose, which is generally recognized as failure, but is not necessarily treated as failure.

It should be noted that the present invention is not to be limited to the aforementioned embodiment, and that modifications, improvements, etc. within a scope that can achieve the object of the present invention are also included in the present invention.

In the abovementioned embodiment, although the data of captured images inputted to the image capture control unit 41 is the data of captured images that are sequentially outputted from the image capture unit 16, the present invention is not limited thereto, and it may be data of a plurality of images that are captured consecutively, such as data of a plurality of static images acquired by so-called continuous shooting. It should be noted that the images are not limited to images captured by the image capture unit 16 of the image capture apparatus 1 and may be images captured by another apparatus that is not illustrated. Furthermore, in the abovementioned embodiment, the live view image is displayed so as to be superimposed on the mini photographing review image, however, the area of the live view image can be reduced to avoid the live view image being hidden, and the live view image and the mini photographing review image can be displayed side by side.

Furthermore, in the abovementioned embodiment, although the image capture apparatus 1 to which the present invention is applied is explained with a digital camera as an example, the present invention is not limited thereto.

For example, the present invention can be applied to various electronic devices having an image analysis function, an information notification function, or the like. More specifically, for example, the present invention can be applied to a lap-top personal computer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof. While the present invention has been described with reference to the preferred embodiments, it is intended that the invention be not limited by any of the details of the description therein but includes all the embodiments which fall within the scope of the appended claims.

What is claimed is:

1. An image capture apparatus, comprising:
    an image capture section that captures an image of a subject;
    a live view image display section that sequentially displays captured images that are sequentially outputted from the image capture section on a display screen as a live view image;
    a review image display section that, in a case of photography and recording being directed, displays a captured image for recording outputted from the image capture section as a first review image on a portion of the display screen, while maintaining a state of displaying the live view image sequentially;
    a photographing result evaluation section that evaluates a photographing result based on the captured image for recording outputted from the image capture section according to a direction to photograph and record; and
    a display control section that performs display control to display the first review image with a display form in a color representing an evaluation result by the photographing result evaluation section, the color differing for different evaluation results.

2. The image capture apparatus according to claim 1, wherein the photographing result evaluation section judges whether photography results in success or failure.

3. The image capture apparatus according to claim 1, wherein the display control section sets a frame of the first review image to at least one of a display form in which the frame of the first review image has the color representing an evaluation result of the photographing result evaluation section and a display form in which the first review image is displayed in colors representing the evaluation result.

4. The image capture apparatus according to claim 2, wherein, in a case in which the photographing result evaluation section judges that photography results in failure, the display control section displays the first review image with a rectangle in the color representing the evaluation result, and a part in which a photography failure factor occurs in the first review image in a distinguishable manner.

5. The image capture apparatus according to claim 1, wherein the review image display section displays the captured image for recording as a second review image of a size larger than a size of the first review image in place of the live view image on the display screen, and the display control section performs display control display the second review image with a display form in the color representing the evaluation result, the color differing for different evaluation results.

6. The image capture apparatus according to claim 5, wherein the display control section switches from the live view image on which the first review image is superimposed to display the second review image that is the captured image for recording outputted from the image captured section, a size of which is larger than a size of the first review image, in response to a predetermined operation being performed while displaying the first review image.

7. The image capture apparatus according to claim 1, wherein:
    the review image display section displays a plurality of the first review images according to a plurality of times of photographing on the display screen, and
    the display control section displays each of the plurality of the first review images with a display form in the color representing the corresponding evaluation result for the each of the plurality of first review images, the color differing for different evaluation results.

8. The image capture apparatus according to claim 2, wherein:
    in a case in which the photographing result evaluation section judges that photography results in failure, the photographing result evaluation section specifies a photography failure factor from among a plurality of factors, and
    the display control section selects a display form of the first review image from among a plurality of display forms having colors determined in advance for each of the plurality of factors according to the photography failure factor specified by the photographing result evaluation section.

9. The image capture apparatus according to claim 5, wherein:
    the review image generation section switches, in response to a switching operation, between a setting of displaying the first review image and a setting of displaying the second review image as an image showing a photographing result upon photographing, and
    the display control section selects a display form of the first review image or the second review image based on the setting of displaying in response to the switching operation according to the evaluation result by the photographing result evaluation section.

10. The image capture apparatus according to claim 6, wherein,
    the display control section displays the first review image with a rectangle in the color representing the evaluation result by the photographing result evaluation section, and displays the second review image in which a portion of a photography failure factor occurs is displayed in a distinguishable manner.

11. The image capture apparatus according to claim 2, wherein, in a case in which the photographing result evaluation section judges that photography results in success, the display control section displays the first review image so as to have an outer frame in a color indicating success in photography, and in a case the photographing result evaluation section judges that photography results in failure, the display control unit displays a second review image in place of the live view image on the display screen, a size of which is larger than a size of the first review image, the second review image being displayed so that a part in which a photography failure factor occurs is distinguishable, on the display screen as an image showing a photographing result.

12. A display method, comprising:
- a live view image display step that sequentially displays captured images that are sequentially outputted from an image capture section that captures an image of a subject on a display screen as a live view image;
- a review image display step that, in a case of photography and recording being directed, displays a captured image for recording outputted from the image capture section as a first review image on a portion of the display screen, while maintaining a state of displaying the live view image sequentially;
- a photographing result evaluation step that evaluates a photographing result based on the captured image for recording outputted from the image capture section according to a direction to photograph and record; and
- a display control step that performs display control to display the first review image with a display form in a color representing an evaluation result by the photographing result evaluation step, the color differing for different evaluation results.

13. A non-transitory storage medium encoded with a computer-readable program that enables a computer to execute functions comprising:
- a live view image display function that sequentially displays captured images that are sequentially outputted from an image capture section that captures an image of a subject on a display screen as a live view image;
- a review image display function that, in a case of photography and recording being directed, displays a captured image for recording outputted from the image capture section as a first review image on a portion of the display screen, while maintaining a state of displaying the live view image sequentially;
- a photographing result evaluation function that evaluates a photographing result based on the captured image for recording outputted from the image capture section according to a direction to photograph and record; and
- a display control function that performs display control to display the first review image with a display form in a color representing an evaluation result by the photographing result evaluation function, the color differing for different evaluation results.

* * * * *

UNITED STATES PATENT AND TRADEMARK OFFICE
CERTIFICATE OF CORRECTION

| | |
|---|---|
| PATENT NO. | : 9,253,406 B2 |
| APPLICATION NO. | : 14/191124 |
| DATED | : February 2, 2016 |
| INVENTOR(S) | : Nobuyoshi Nishizaka |

It is certified that error appears in the above-identified patent and that said Letters Patent is hereby corrected as shown below:

In the Claims

Column 20, line 13, after "control" insert --to--.

Column 20, line 20, change "captured" to --capture--.

Signed and Sealed this
Thirty-first Day of May, 2016

Michelle K. Lee
*Director of the United States Patent and Trademark Office*